June 2, 1970  H. L. BOWDITCH ET AL  3,515,162
TILT-RING PNEUMATIC CONTROL DEVICE
Filed Nov. 1, 1968  10 Sheets-Sheet 1

INVENTOR.
HOEL L. BOWDITCH
GEORGE F. WILLIAMS
RICHARD A. BERTONE
BY
Lawrence H. Poston
AGENT

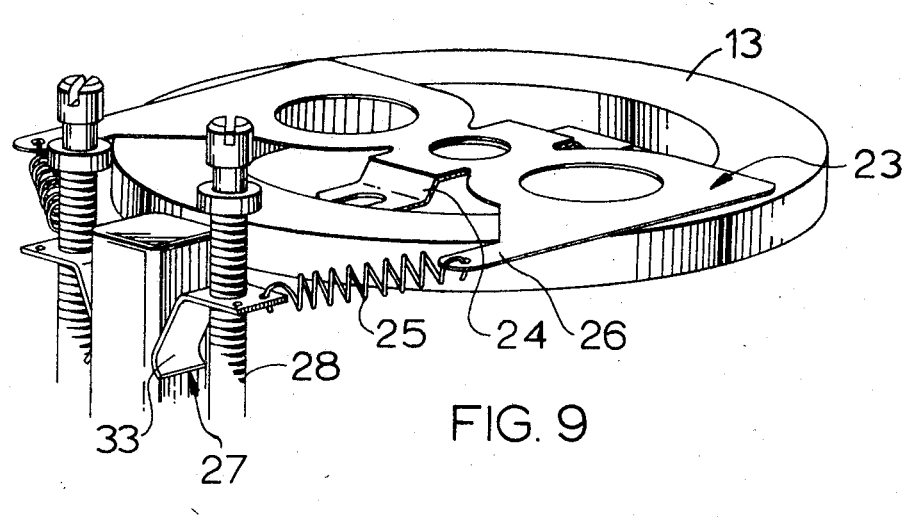
FIG. 9
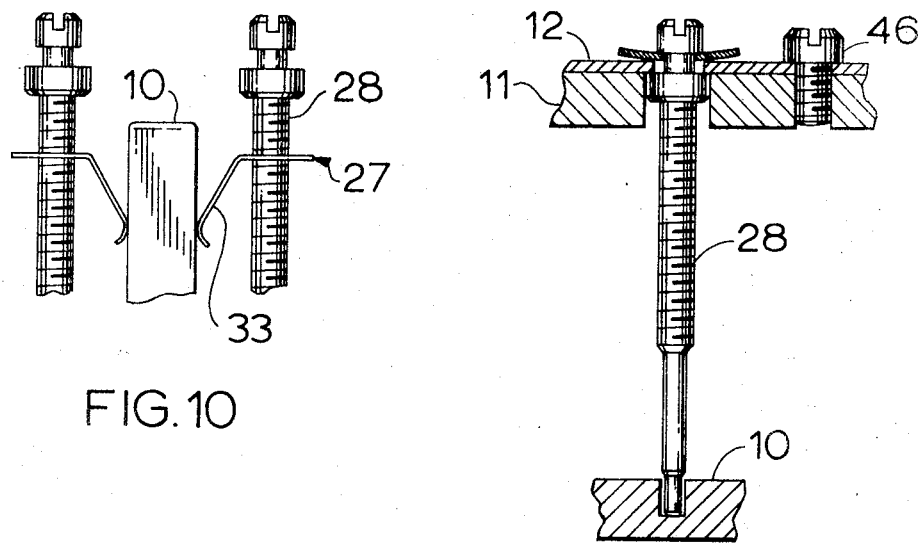
FIG. 10
FIG. 11
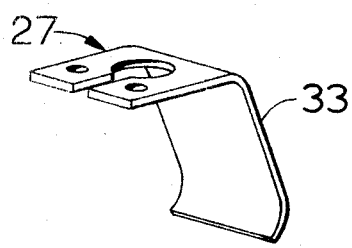
FIG. 12

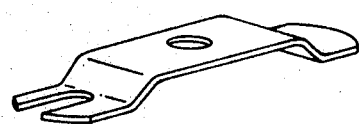
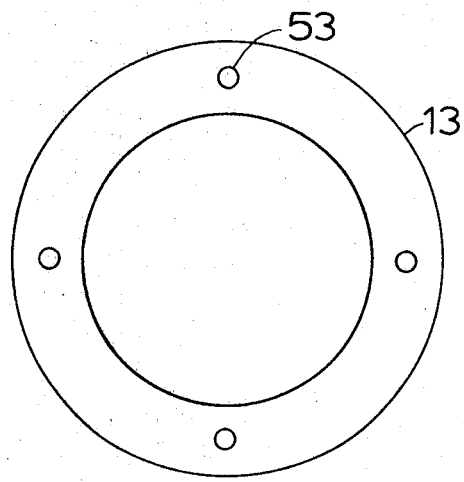
FIG.15
FIG. 16
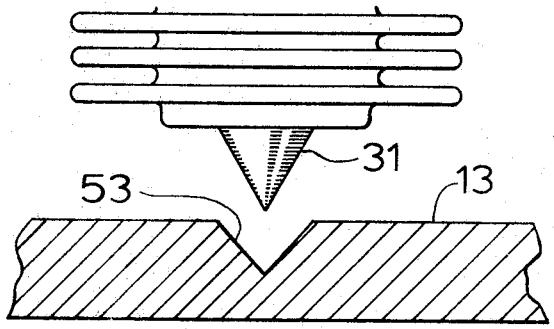
FIG.17

United States Patent Office 3,515,162
Patented June 2, 1970

3,515,162
TILT-RING PNEUMATIC CONTROL DEVICE
Hoel L. Bowditch, Foxboro, Mass., George F. Williams, Riverside, R.I., and Richard A. Bertone, Franklin, Mass., assignors to The Foxboro Company, Foxboro, Mass., a corporation of Massachusetts
Filed Nov. 1, 1968, Ser. No. 772,600
Int. Cl. F15b 5/00
U.S. Cl. 137—86       8 Claims

ABSTRACT OF THE DISCLOSURE

In fluid operated control, a precision, balanceable tilt system using a universal flexure support for tiltable means in said system, with essentially fixed force spring zero adjust means. In combination with such means, also, geared means for adjustment of proportion in the balanceable system, and/or means for reversing forces applied to such tiltable means, and/or special bellows construction for such tilt system.

---

This invention relates to industrial control in which a fluid operated control system is used. It has particular reference to control assemblies of the tilt-balanceable type.

This invention provides precision means in such a tilt system, in particular in the support and adjustment of tilt means in such a system, and is also considered in its precision concept in combination with such elements as proportion adjustment, means for reversal of forces applied to such tilt means, and a special form of bellows for tilt force application.

The illustrative embodiment of this invention as presented herein involves the use of a ring balance, fluid operated control assembly.

A pneumatically operated industrial controller from which the device of this invention stems historically is disclosed in a patent to Mason; 2,476,104.

More recently, and more directly, this invention is based on the general control concepts disclosed in a patent to Bowditch; 2,742,917.

The controller of the Bowditch patent operates on the force-balance principle. Forces exerted by bellows on a floating disc cause the disc to pivot about an adjustable proportional band fulcrum lever. Different bellows apply balancing forces to the floating disc, for example, a measurement force representative of a variable condition, and an opposing balancing force. The floating disc acts as the flapper of a conventional flapper-nozzle system. The moments of force set up by these bellows applications, as well as others which may be used, such as set-point bellows, or reset bellows, or a spring in place of the reset bellows, determine the position of the floating disc in relation to the nozzle, and resultant nozzle back pressure changes, through a relay, produce the working output pressure of the system, which is also the balancing pressure mentioned above.

The proportional band of this system is variable by changing the position of the fulcrum lever.

This invention provides new and useful forms of such systems, particularly in that precision structures are set forth in the form of compact assembly with adjustments thereof provided in grouped accessibility and with means for substantially increasing the effectiveness of the control interface between human action and instrument operation, by providing precision reaction to manual operation, effectuated for example, by special universal flexure floating support of a tilt ring, and essentially fixed force zero-adjust spring means for the tilt ring.

Other objects and advantages of this invention will be in part apparent and in part pointed out hereinafter and in the accompanying drawings, wherein:

FIGS. 1 and 2 are plan and partially sectioned elevation views respectively of a control unit structure according to this invention;

FIGS. 3 and 4 respectively are schematics of an operating system and a support system, therefor, of the structure of FIGS. 1 and 2;

FIGS. 9 through 17 are various explanatory showings of the tilt ring structure according to this invention, with illustrations of associated features such as the zero-adjust system;

Figure 1:
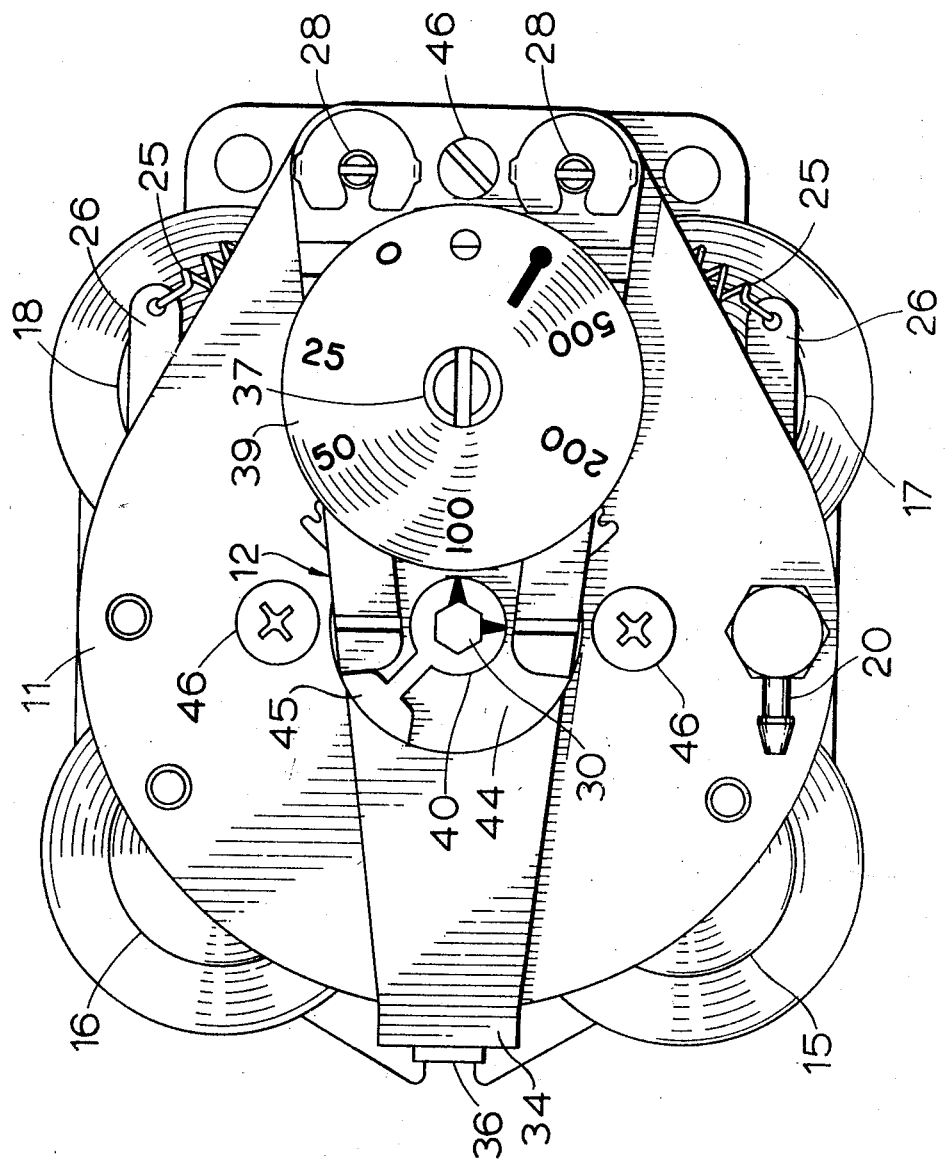
Figure 2:
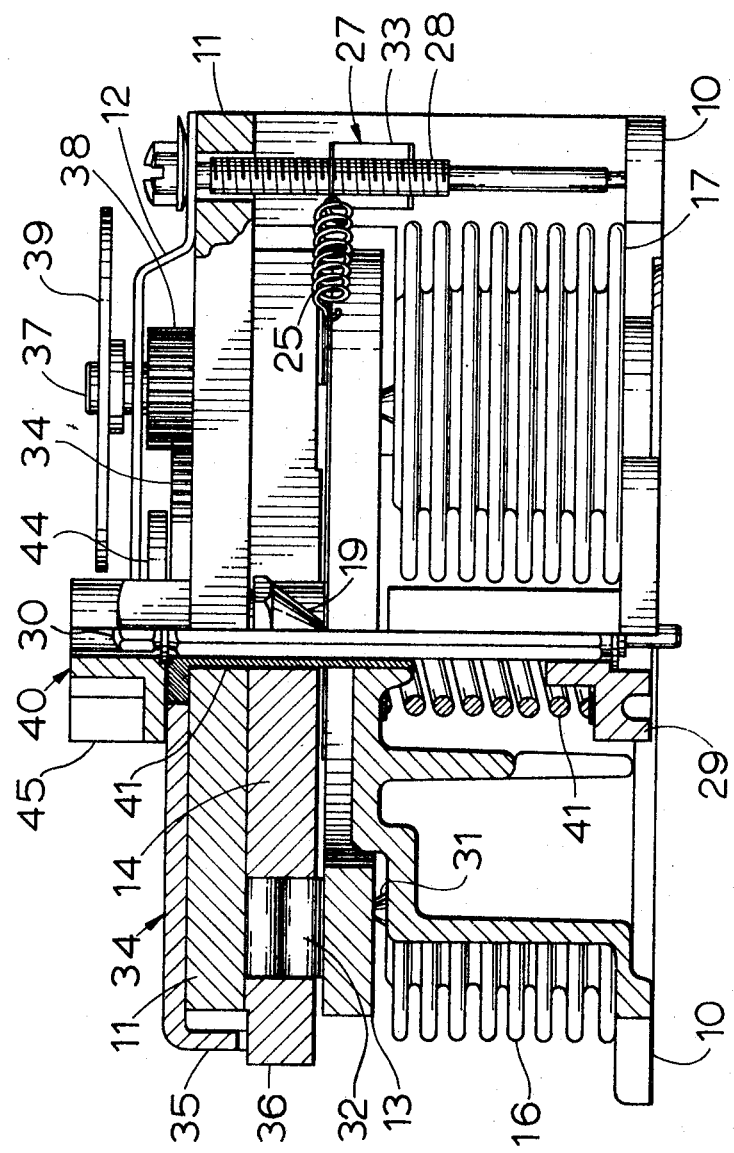

The structural drawings of FIGS. 1 and 2 are shown to illustrate the simplicity of design, and the compactness and precision of an assembly built according to this invention. Reference back to these figures from the descriptions of the more schematic figures following herein, will provide identification of the various units and systems therein.

Since a single structure is presented by way of illustration of the features of this invention, like reference numbers are applied to like elements throughout the drawings.

Figure 3:
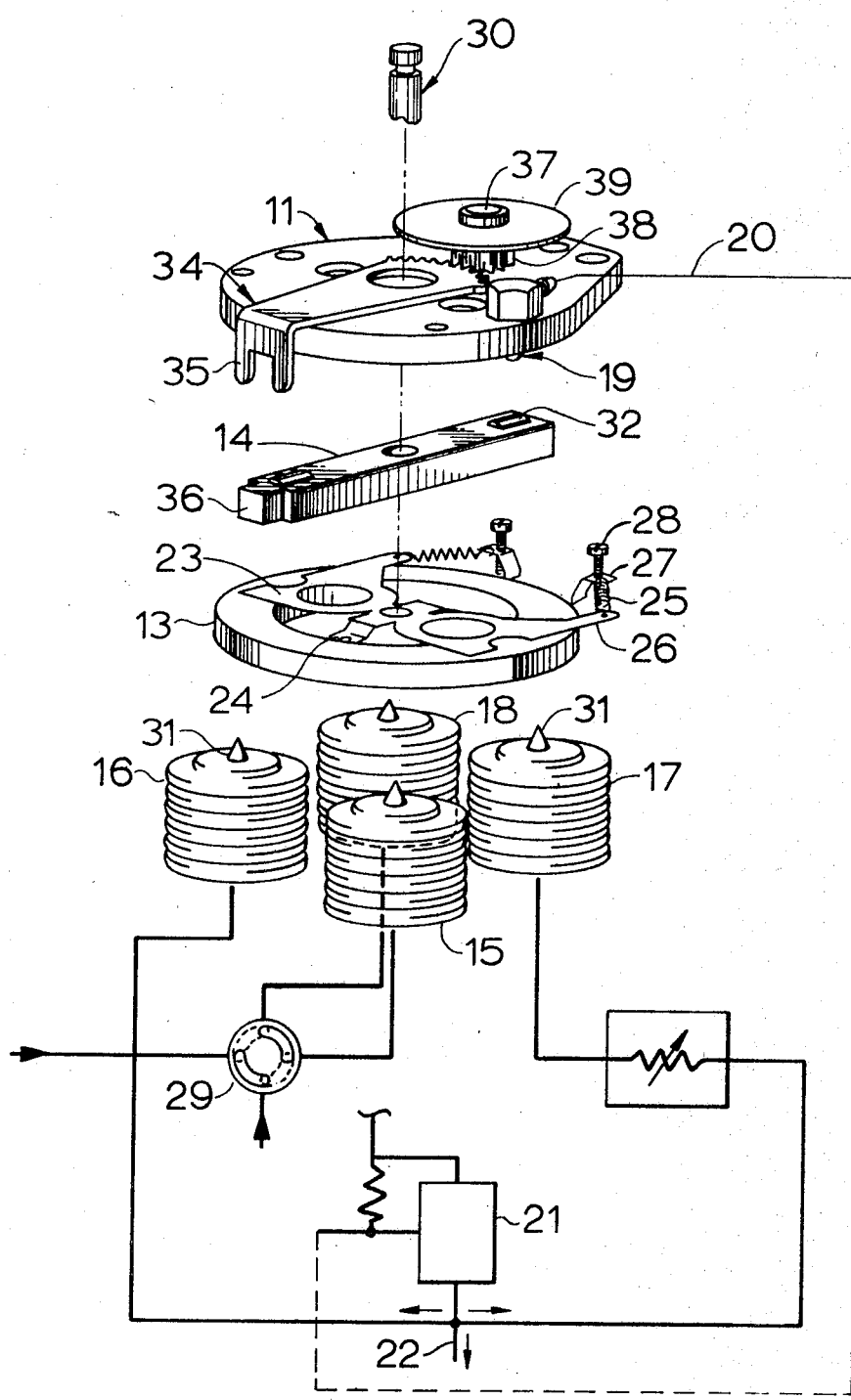
Figure 4:
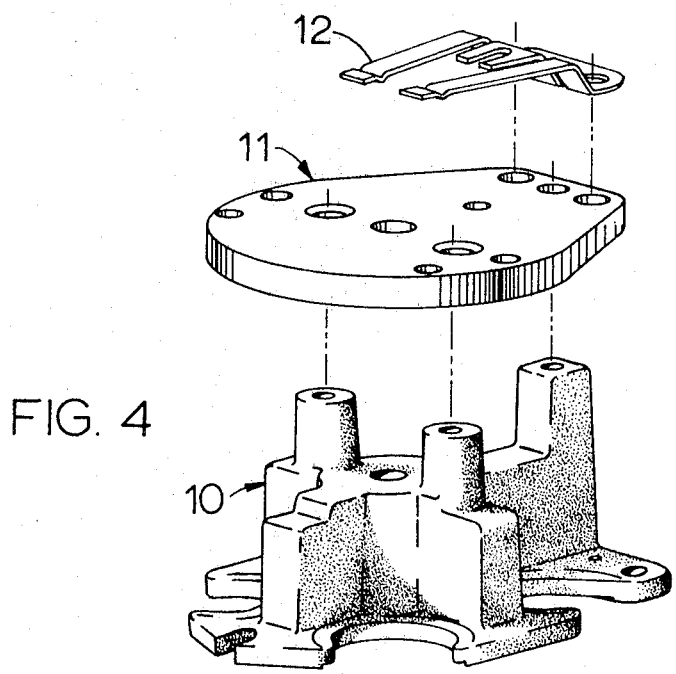

FIGS. 3 and 4 are considered together, with the support structure of FIG. 4 comprising a base block 10, a top plate 11, and a top bracket 12, arranged to contain and support the operating system of FIG. 3.

In FIG. 3, the system comprises a tilt ring 13 which is tiltable about a fulcrum arm 14 by means of various forces applied to the underside of the ring 13 by pressure in the bellows in which 15 is a measurement bellows, 16 is a feedback, balancing bellows, 17 is a floating or reset action bellows, and 18 is a set-point bellows; these being well-known forces and functions in pneumatic control unit systems in industrial instrumentation as applied to process and energy control.

In furtherance of the general functions of such pneumatic control systems, a nozzle 19 is mounted in the top plate 11, extending downward therethrough into adjacency with the top of the tilt ring 13, in a nozzle-baffle sensor arrangement in which the ring is the baffle, moved toward or away from the nozzle 19 in response to the resultant of the combined forces in the various bellows.

Varying constriction thus produced with respect to the nozzle 19 results in varying back pressure in the nozzle feedline 20, with its consequent effect on the relay 21, regulating the output therefrom as an operating signal which is applied to the feedback bellows 16, the reset bellows 17, and as a working output signal as indicated at 22. As a brief outline presentation followed by further detail later herein, the proportional band of this system is variable by adjustment of the proportional lever 14 about its central vertical axis to locate the lever on a different diameter of the tilt ring, thus varying the moment arm relationships of the various bellows with respect to the proportional lever 14. The tilt ring is mounted for universal flexibility through a flexure member 23 spot welded to the top thereof, with the flexure member 23 centrally mounted on a transverse support bracket 24. Zero adjustment of the tilt ring 13 is accomplished through springs 25 attached to extension arms 26 of the flexure 23, and through vertically movable clips 27 on screws 28, as the outer end connections of the springs 25. Further, the pressure in the measurement and set point bellows 15 and 18 may be reversed by rotation of a pneumatic switch shown schematically at 29 by means of a vertically central shaft generally indicated at the top of the drawing, at 30. The various bellows are provided with specially mounted pins 31 on their free ends, for precise location and operational contact with the underside of the tilt ring 13.

PRECISION ZERO ADJUSTMENT

Further, in FIG. 3, the balance ring 13, as a tilt device, is supported by spot welding to the universal flexure member 23, which in turn is mounted on the bracket 24 which is secured to the base casting 10 (FIG. 4). The balance ring is fixed against movement in its own plane, but is universally tiltable about its central portion which is secured to the central portion of the bracket 24. Such tilting is about the longitudinal axis of the proportional arm 14 as a line pivot. The arm 14 is provided with rollers 32 for engagement above and below with the top plate 11 and the balance ring 13, respectively.

Zero-adjust means for the balance ring, in terms of zeroing its tilt position, is provided by the flexure extension arms 26, in the plane of the main flexure body and with the arms extending beyond the balance ring at an angle to the main flexure body, making the whole flexure unit essentially in the shape of a U. As set forth in more detail in FIGS. 9 through 13, the outer ends of the flexure arms 26 are connected by coil springs 25 to clips 27 which are vertically adjustable, that is, transversely of the plane of the flexure member. The clips 21 are threadedly mounted on screws 28 and have resilient guide portions 33 bearing on an upright portion of the instrument base 10, to prevent rotation of the clips 27 as the zero screws 28 are rotated.

Accordingly, as the clips 27 are moved up or down, the balance member 13 is tilted up or down and the zero springs 25 are maintained with essentially fixed force. This provides precise and accurate means of essentially linear adjustment of the zero by means of rotation of the screws 28. The device thus has many advantages. For example, it is stable, and backlash is minimized.

PRECISION PROPORTIONAL BAND ADJUSTMENT

FIG. 3 shows the proportioning arm 14 rotatable in a horizontal plane about its vertically central axis to vary the moment arm relationships of the various bellows thereto, as a means of adjusting the device to provide different effects on the balance ring 13 from the forces in the bellows. Such changes result in proportional band changes in this control unit.

The mechanism of the proportional band adjustment is provided to enable precision adjustment due to the mechanism and due to the form and location of manually operable means for accomplishing the adjustment and indicating the amount of the adjustment. This mechanism comprises a horizontal sector gear arm 34 mounted on the upper surface of the top plate 11 for pivotal movement about a vertical axis. The sector arm 34 is provided with a depending U dog 35 which hangs over and follows the edge of the top plate on a radius from the sector arm pivot. The sector arm dog 35 fits over boss 36 on one end of the proportioning arm 14. Also mounted on the upper side of the top plate 11 is a vertical shaft 37 on which is fixed a gear 38 in mesh with the sector gear of the arm 34, and on which is also fixed an indicator dial 39 which is manually rotatable to pivot the sector arm 34 and consequently to pivotally adjust the proportioning arm 14. Thus delicate and precise proportioning band adjustment may be made with this system.

PRECISION BELLOWS FORCE REVERSAL

In a control unit of this nature, it is desirable for different applications to provide means for reversing the effects of certain of the bellows as applied to the balance ring 13. For example, FIG. 3, as between the measurement bellows 15 and the set point bellows 18, the application of pneumatic signals thereto may be reversed by means of the signal switch 29, so that the bellows 15 becomes the set point bellows and the bellows 18 becomes the measurement bellows. In one of these situations, an increased measurement signal results in an increased feedback (output) signal, and in the other of these situations, a decreased measurement signal results in an increased feedback (output) signal. This is a known procedure in control units. However, the means for achieving this function in the device of this invention is unique and lends itself to precision operation.

The assembly and mounting of this pneumatic switch system is detailed in FIGS. 18 through 21. The overall device extends vertically through the center of the control unit, with the adjustment end at the top, and the pneumatic switch body 29 at the bottom. The pneumatic circuit changes resulting from the operation of the switch system may be traced by reference to FIG. 3 and the schematic showing therein of the switch 29.

Figure 21:
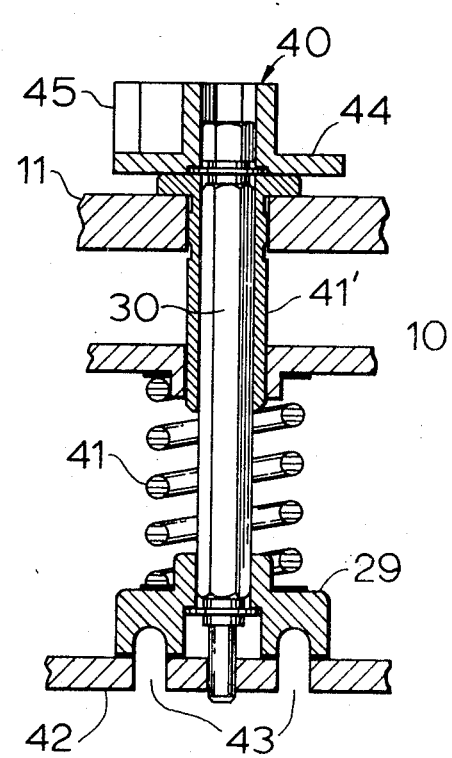
Figure 20:
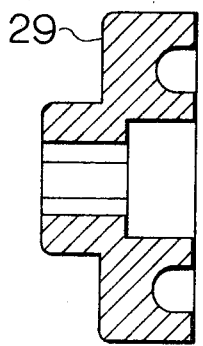
Figure 19:
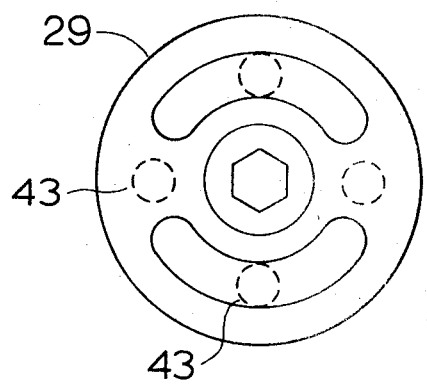

As in FIG. 21, the pneumatic switch assembly comprises the hexagonal main shaft 30 with a top unit 40 having a hexagonal hole therein for mounting on the top end of the shaft 30. Similarly, at the bottom, the pneumatic reversing switch 29 has a hexagonal mounting hole therein for receiving the bottom end of the shaft 30. The shaft 30 is mounted in a sleeve bushing 41 and the assembly is suitably held in the base 10 of the control unit by a coil spring 41 which presses the open lower face of the switch 29 against a mounting plate 42, through which suitable pneumatic passage holes 43 are provided between the pneumatic circuit system (FIG. 3) and the pneumatic passages in the switch 29. The shaft bushing 41' has a top flange resting on the upper side of the top plate 11, and the bracket 12 (FIG. 3) has a central portion resiliently riding on a horizontal flange 44 of the top unit 40, pressing this unit and the bushing 41 downward. Locating and holding washers are provided, top and bottom, to complete the assembly. The top unit 40 is rotable by a hex wrench set into the hexagonal hole in the unit 40. There are two positions of the switch 29, and the unit 40 has a hammer-like horizontal extension 45 (FIG. 1) which engages the outer ends of the top bracket 12 as stops, precisely registering the proper positions as achieved by the switch 29. On the top of the unit 40, indicator lines may be provided in verification of these positions.

PRECISION ASSEMBLY

Reference to FIG. 1 illustrates the improvement in this invention in lessening the chance for human error by placing three major adjustment means on top of the instrument, together and readily identifiable. These are the zero adjust screws 25, the proportioning band dial 39, and the pressure switch top unit 40.

FURTHER DISCUSSION OF THE STRUCTURES

Figure 5:
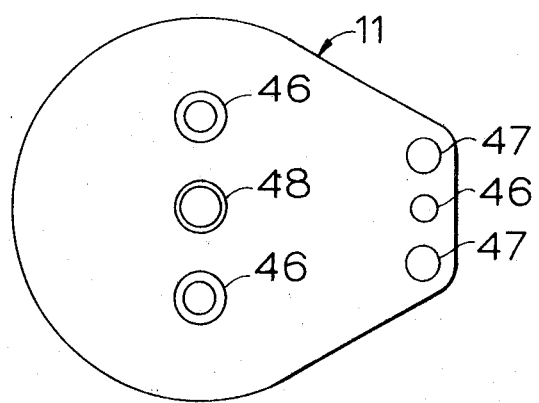
FIGS. 5, 6, 7 and 8 are, respectively, plan views of the top plate, the top plate bracket, and partial views of the top structure seen in FIG. 1.

The FIG. 5 showing of the top face of the top plate 11, shows the three mounting holes 46, through which the top plate is bolted to the three uprights (FIG. 4) on the instrument base 10. Holes 47 are provided for the zero adjust screws 28, and the control opening 48 is for containing the pneumatic switch assembly of FIG. 21.

Figure 6:
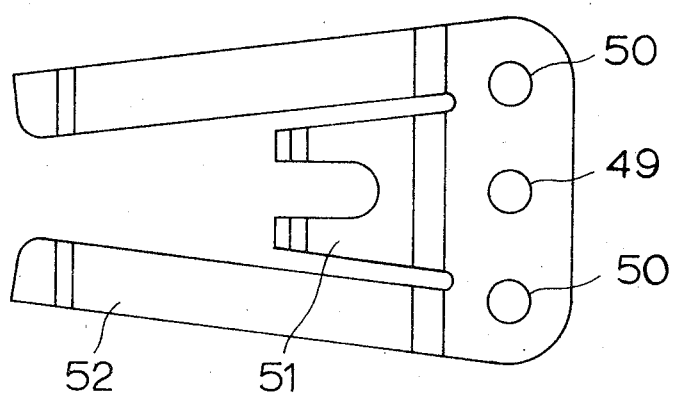

The top bracket showing of FIG. 6 shows a top plate mounting hole 49, zero adjust screw holes 50, a central downwardly resilient U portion 51 for receiving and bearing on the proportional band dial assembly, and an outside, downwardly resilient portion 52 for bearing on the top of the pneumatic switch assembly and providing end stops for the adjustment of that assembly.

Figure 7:
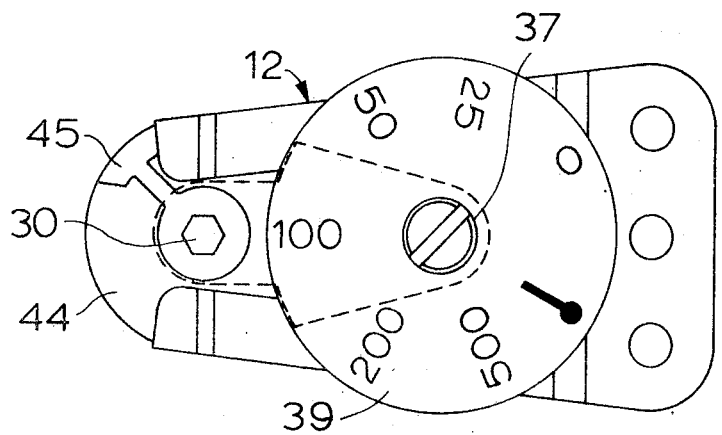

FIG. 7 is a further view of the top of the instrument, with dotted line 53 indicating the visible area of the switch and proportional band adjust means through an opening in the instrument housing.

Figure 8:
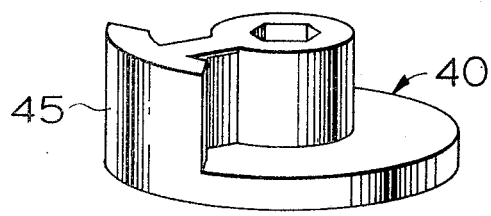

FIG. 8 is a perspective in further showing of the top member 40 of the pneumatic switch assembly (FIG. 21).

Figure 13:
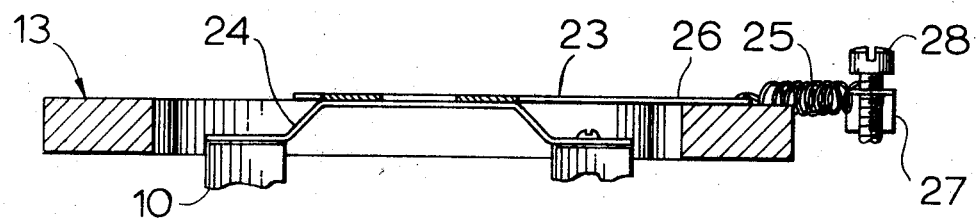
Figure 14:
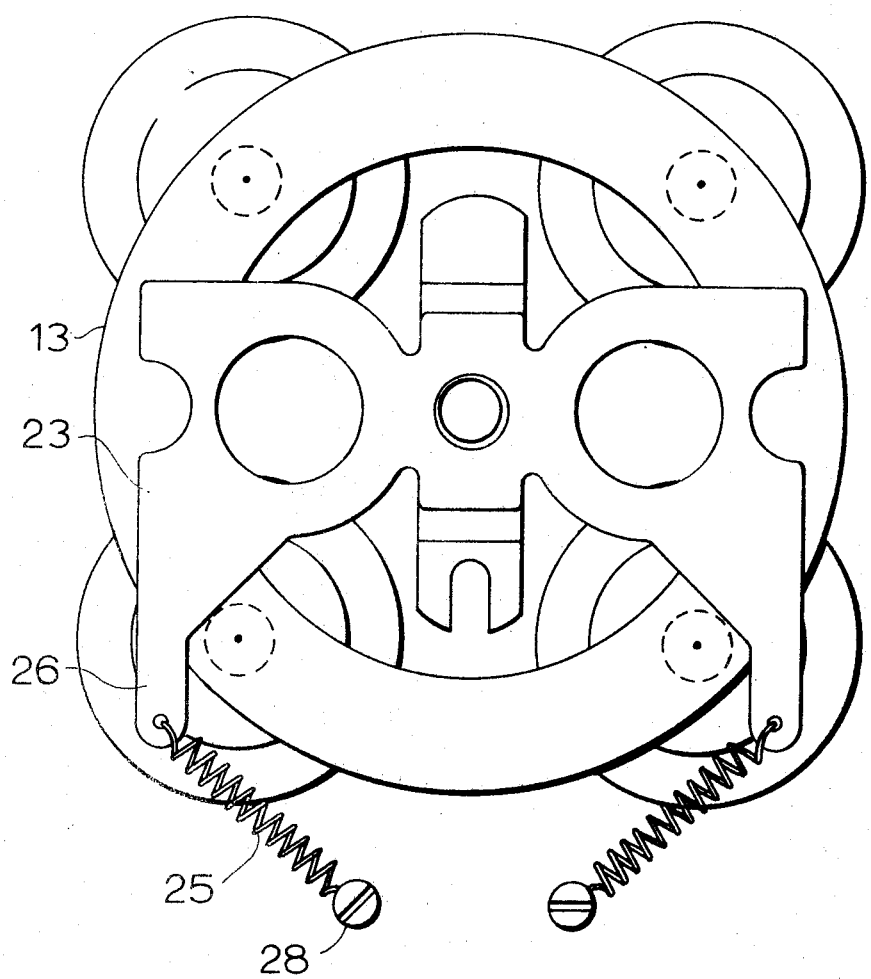
Figure 18:
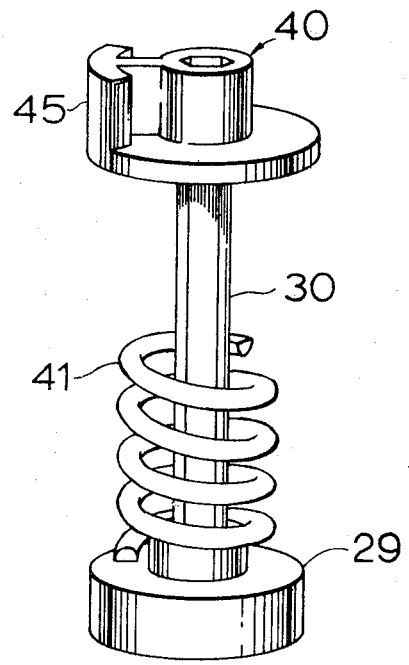
FIGS. 18 through 21 are various showings of the structure used to reverse signals as applied to selected bellows in the system of FIG. 3.

FIGS. 13, 14, and 15 further illustrate the balance ring mounting and zero adjust system.

FIGS. 16 and 17 illustrate the mechanics of the application of the bellows units to the underside of the balance ring 13, showing matching conical openings 53 for receiving the conical interconnect pins 31 on the tops of the bellows.

BELLOWS ASSEMBLY

A useful form of bellows structure is provided in this control unit, and illustrated in FIGS. 22 through 25.

This structure provides a connector between two bodies of movement in a control instrument, for example, a pin on the end of a bellows for engaging and transmitting the bellows effect to another element, with the pin in simple and precise mechanical assembly with the bellows and lending itself to precise operative location engagement with the other element.

This invention provides connections between operating elements in control systems and in particular in pneumatic control systems for precise interconnection between bodies of movement therein based on simple mechanical assembly between an interconnection member and one of the bodies, with means provided for precision engagement of that member with the other of the bodies.

An illustrative example is of a pin mounted on the end of a bellows for operative engagement with a balance member to transmit the bellows effect to the balance member.

In industrial instrumentation and in the use of pneumatic control systems and the like, signals in representation of various process parameters or conditions are often applied to bellows units or other pressure responsive devices, as a means of actuating the control systems. In such bellows systems, some form of mechanical interconnection is often necessary between the bellows and the element it influences.

It has been customary to weld or solder a plate on the bellows end for strength and to weld or solder a connector pin on this plate. For modern instrumentation, this is too expensive and is too difficult to provide and duplicate, in view of low cost and precision necessities.

This structure provides simple, inexpensive, and highly precise mounting of such a pin on a bellows for such purpose, and lends itself to extension of such precision to the location of operative engagement of the pin with respect to the element to be affected by the bellows action.

In this invention, for example, a conical pin has its base pressed into, but not through, the movable end wall of a bellows, with the surface material of this end wall flowed constrictingly about the conical pin.

This simple, precise, and inexpensive pin assembly makes possible highly precise and duplicatable interconnection between the bellows and the element to be influenced thereby.

Figure 22:
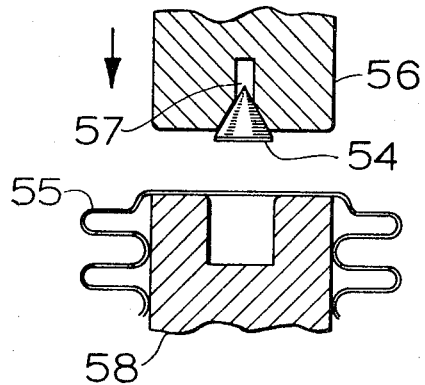
FIGS. 22 through 25 illustrate the structure and forming of bellows units in the device of this invention, such as the bellows of FIG. 3.
Figure 23:
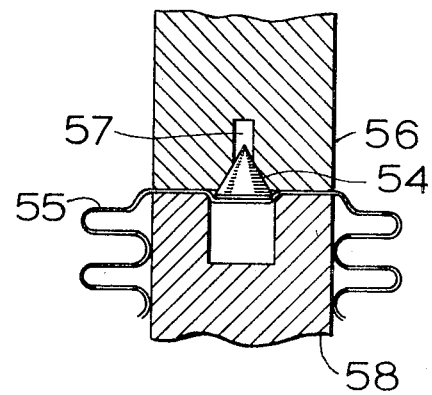
Figure 24:
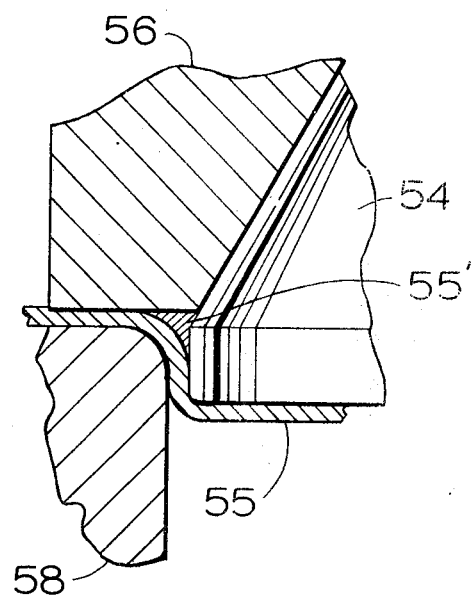

In FIGS. 22, 23 and 24 the press-mounting of a solid conical pin 54 into the movable end wall of a bellows 55, without penetrating that wall, is presented in a schematic showing of die-press operation. The surface material may be press-flowed about the reduced diameter just above the pin base, when extra holding means is required, see the shaded area 55' in FIG. 24.

Holding tool 56 is provided for the conical pin 54, with top clearance at 57 to avoid damage to the apex of the cone during the die press operation.

The bellows 55 is mounted on an internal sleeve fixture 58 in support of the end face of the bellows, with the inner diameter of the fixture sleeve sufficient to accommodate the base of the pin 54 and the distorted wall thicknesses of the bellows end, see FIG. 24.

As in FIG. 23, the holding tool presses the conical pin base into the end wall of the bellows, creating a cup therein without penetrating the end wall.

Further downward movement of the holding tool 56 forces outer portions of the bellows end wall constrictively radially inward about the conical pin.

Suitable die stops (not shown) are used to prevent penetration of the bellows end wall by the conical pin in this assembly.

Figure 25:
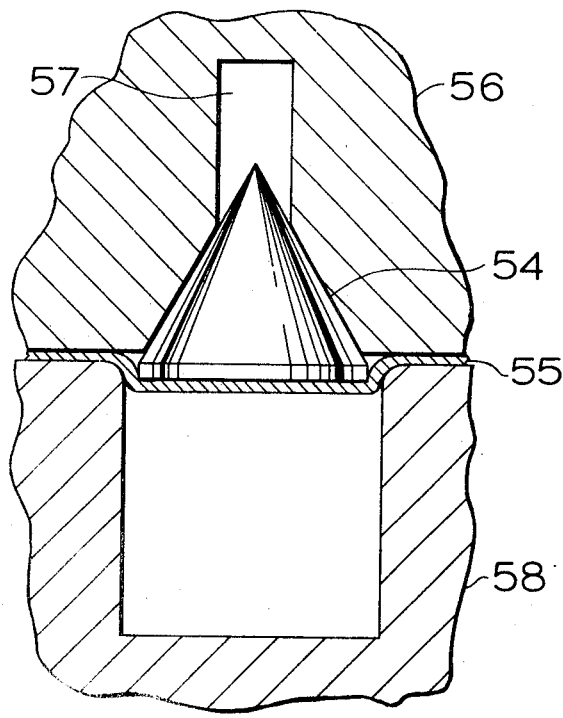

One form of such mechanical gripping is seen in FIG. 25. Various shapes and forms of the holding tool fixture as well as of the base of the pin, may be used to secure the pin to the bellows in accordance with particular applications, as desired.

This invention, therefore, provides a new and useful control unit, exemplified by a ring balance pneumatic system, with precision combinations to improve the human-instrument interface in the control loop.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

We claim:

1. For use in a system of process and/or energy control, a precision controller assembly which is fluid operated and balanceable, wherein a pilot signal is produced in representation of a measured variable condition in such process and/or energy situation, with power means activated by said triggering signal to produce an output which is applied both as a balancing force for said assembly and as a working output force, said assembly being of the type wherein a force-balance instrument is responsive to the valve of said measured condition and which comprises, in combination, a rotatable fulcrum, a ring balance member tiltable about said fulcrum, a detecting member mounted for effective cooperation with said balance member to detect tilting movement thereof, and first and second means positioned to engage spaced points on said ring balance member to exert tilting forces thereon and effectively responsive respectively to the value of said measured condition and to the tilting of said balance member as detected by said detecting member, said fulcrum being rotable to vary the axis around which said balance member tilts and having an axis of rotation substantially parallel to the lines of action of the forces exerted by said first and second means, the tilting of said first and second means being exerted in opposite directions about the tilting axis of said balance member, in such a system, and in such an assembly, precision operating means comprising, in combination, a tilt system of a universal flexure and mounting for said balance member, said tilt system comprising a support bracket, a universal flexure member mounted on said support bracket, a tilt ring as said balanceable member secured to said universal flexure member, and zero-adjust means operatively secured to said flexure member in essentially fixed force spring relation thereto, said support bracket comprising a bridge member mounted on a base for said assembly, said universal flexure member comprising a main flexure strip mounted transversely of said bridge member with said bridge member secured together in the central area of both, said flexure strip having end extensions at an angle thereto, and in the same plane, said balanceable tilt ring being secured to said flexure strip with the main flexure strip and said support bracket lying in diameter planes of said tilt ring, with said planes essentially at right angles to each other, and said zero-adjust means connected to said end extentions of said flexure strip and comprising coil spring means connected between said end extensions and clip member, and means for adjusting the tilt of said balanceable ring by moving said clip member in a direction transversely of the plane of said flexure member, whereby said springs are maintained essentially as fixed force devices.

2. A controller according to claim 1 wherein said balanceable ring tilt adjustment means includes rotatable screw members with their ends fixed except for rotation, said clip members each mounted on one of said screw members for movement along the thread thereof as the screw is rotated, with the spring attached to the clip so moved, remaining essentially in the plane of said ring as tilted by such adjustment, and extension means on each of said clips engaging and riding along an abutment of the base of said assembly, whereby the clips move lengthwise of said screw members without rotation thereabout.

3. In a controller system according to claim 2, said clip members each having a keyhole formation, with said screws mounted in threaded forms in the round openings of said keyholes, and spring connection openings on either side of the leg forms of said keyholes, whereby said clips are interchangeable between said screws.

4. In a controller system according to claim 2, wherein said tilt adjustment provides a zero adjustment for said controller assembly.

5. A controller system according to claim 1, wherein said rotation of said fulcrum provides variation of the proportional effect between said first and second tilting forces, and an operating system for rotating said fulcrum comprises a pivoted lever with depending fingers on one end thereof engaging one end of said fulcrum, a sector gear on the other end of said lever, a manually rotatable shaft with an indicator dial thereon, and a gear meshed with said sector gear.

6. A controller system according to claim 1 wherein said first and second tilting means represent measurement and output respectively in said system, a third tilting means in opposition to said measurement means, as a set point tilting force, and fluid passage switch means for interchanging said measurement and set point tilting forces in terms of reversing their application to said ring balance member.

7. In a system according to claims 5 and 6, means extending through said system for causing said measurement and set point interchange, said means comprising a shaft for rotating said fluid passage switch means, said shaft having means for accomplishing such rotation, located adjacent said manually rotatable shaft for rotating said fulcrum.

8. An industrial control instrument in the form of a balanceable tilt ring member with pneumatic bellows opposedly applied to said tilt ring member to achieve balance thereof in terms of selected pneumatic signals applied to said bellows, and zero adjust means for achieving a desired initial position of said tilt ring member in terms of said tilt function, said zero adjust means comprising a coil spring extending from said tilt member and in the plane thereof, a spring clip on the outer end of said coil spring, means for moving said spring clip transversely of said plane of said tilt member, whereby said spring remains essentially in the plane of said tilt member and essentially at a fixed spring force, and means for guiding said clip in said movement to avoid rotation of said clip with respect to said means for moving said clip.

References Cited

UNITED STATES PATENTS 2,742,917   4/1956   Bowditch _____ 137—86

ALAN COHAN, Primary Examiner

U.S. Cl. X.R.

92—37